Aug. 10, 1937.   R. F. JEHL   2,089,377
SEAL
Filed Dec. 21, 1936
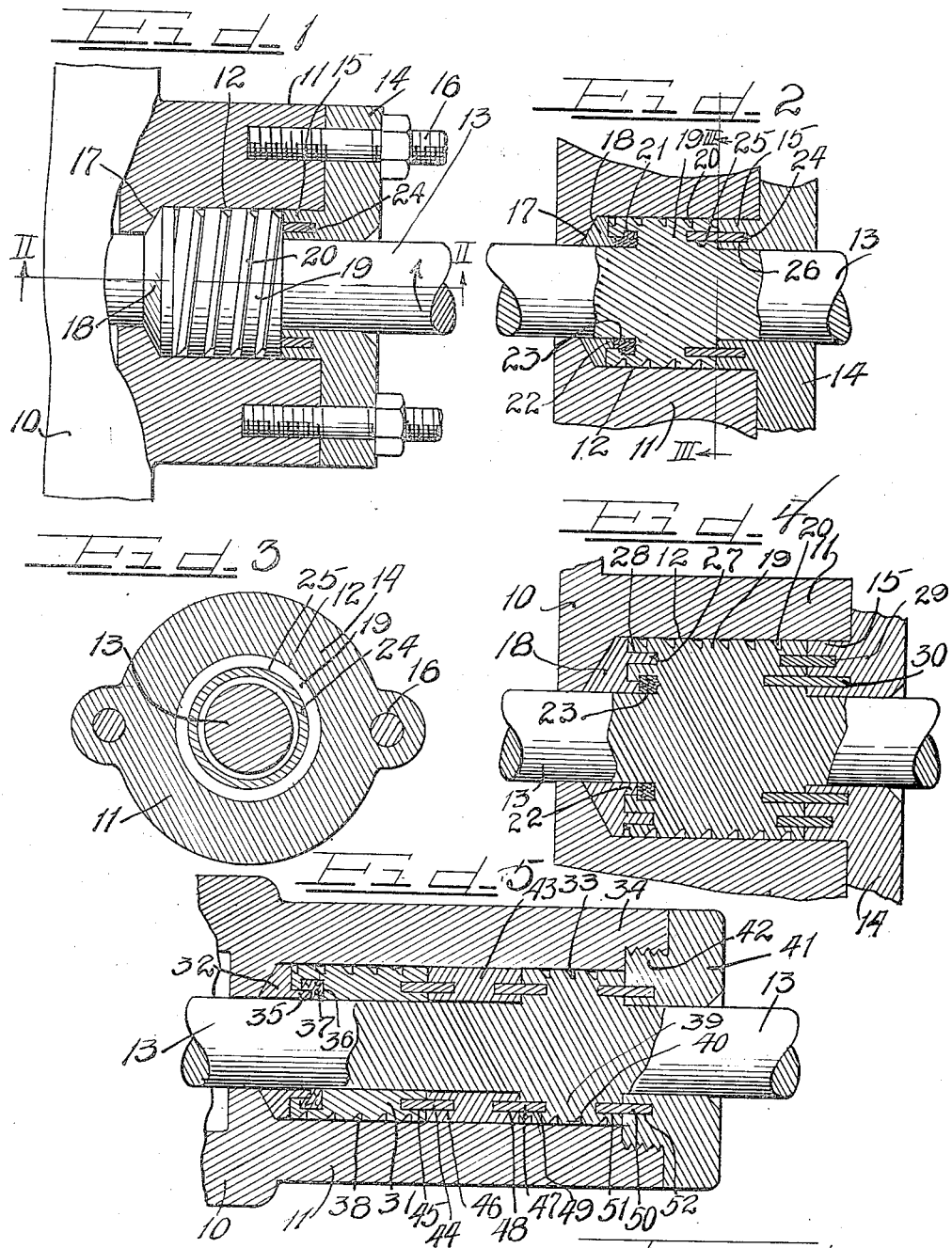
Inventor
Roy F. Jehl.
By Charles H. Wills Attys.

Patented Aug. 10, 1937

2,089,377

UNITED STATES PATENT OFFICE 2,089,377

SEAL

Roy F. Jehl, Chicago, Ill.

Application December 21, 1936, Serial No. 116,874

6 Claims. (Cl. 286—7)

This invention relates to a sealing structure adapted particularly for use in connection with compressors or pumps for preventing leakage of the liquid along the shaft connecting a driving motor with the pump or compressor.

The usual procedure in preventing leakage from the driving shaft end of a pump structure is to provide a stuffing box in which packing material is compressed around and against the driving shaft. With such packing, lubrication is necessary, and in spite of the lubrication, the shaft will become scored and worn by the packing material, and furthermore the resistance caused by the packing material will absorb considerable driving power which should be delivered to the pump.

Therefore, the object of my invention is to provide seal structure and arrangement which will eliminate shaft friction and wear and power loss, and which will require neither lubrication nor adjustment.

A further object is to provide an arrangement comprising an assembly of sealing elements concentric with the driving shaft with more or less floating rotation but providing a tortuous path through which leakage liquid must pass, with one of the elements operating as a screw or spiral pump to oppose and force back the leakage flow, with the net result that the leakage flow pressure is rapidly reduced to a point where it will not be sufficient to expel any leakage liquid to the exterior of the pump structure.

My improved sealing arrangement is incorporated in the structure disclosed on the drawing, in which drawing:

Figure 1 is a side elevation of the driving end of a pump structure with the sealing receiving structure in diametrical section and the sealing structure partly in side elevation and partly in section;

Figure 2 is a view similar to Figure 1 showing the sealing structure in diametrical section;

Figure 3 is a section on plane III—III of Figure 2;

Figure 4 is a view similar to Figure 2 showing a modified arrangement; and

Figure 5 is another view similar to Figure 2 showing another modified sealing arrangement.

On Figure 1 of the drawing is shown the end of the frame 10 of a driven structure such as a pump, the frame having the annular extension 11 providing a housing for the sealing chamber 12 through which extends the driving shaft 13 driven by a driving member such as an electric motor (not shown). The housing 11 has the end closure wall or head 14 surrounding the shaft, and this head is shown as having an inner flange 15 extending into the sealing chamber 12. The head may be secured as by means of bolts 16.

The inner end of the chamber 12 has the bevelled seat 17 for a ring 18 of suitable metal whose inner surface is correspondingly bevelled, this ring preferably fitting snugly against the seat and the cylindrical wall of the chamber 12, and the ring serves as a retaining seat for the sealing assembly. In the arrangement of Figures 1 to 3, the sealing assembly comprises the cylindrical part or element 19 which is secured to rotate with the shaft 13 but which has a running fit with the inner cylindrical wall of the chamber 12. The element 19 may be in the form of an annulus press fitted or otherwise secured to the shaft 13 or, as shown in Figure 2, it may form an integral part of the shaft. In its cylindrical surface the element 19 has circumferentially extending grooves 20, and preferably the grooving is continuous and spirally arranged as best shown by Figure 1, so that when the shaft is rotated in the direction indicated by the arrow, the groove will tend to propel any leakage liquid therein back toward the pump structure, the element 19 thus itself operating as a screw or spiral pump when the shaft is rotated besides affording a comparatively long and tortuous path resisting the outward flow of leakage liquid.

At its inner end the element 19 has the channel 21 of L-shaped cross section surrounding the shaft, and the seat member 18 has an inwardly extending flange 22 surrounding the shaft which flange extends a distance into the longitudinal leg of the L-shaped channel 21 to close this channel and to confine therein retainer material or element 23 which may be in the form of a felt ring of such cross section that after assembly it will be more or less compressed into the channel 21. Any leakage liquid from the pump will follow along the shaft 13 and will pass between the shaft and the seating ring 18 and will then encounter the retainer element 23 and will have to find and force its way through the felt or between the felt and the surfaces adjacent thereto, and between the outer and inner ends respectively of the seating ring 18 and the element 19 to reach the groove 20 in the element 19. Before reaching the groove the resistant and tortuous path around the felt retainer will have materially reduced the pressure of the leakage liquid, and then when the liquid reaches the spiral groove its travel therethrough will be impeded and resisted and the groove will tend to exert pumping action to force the liquid back.

The flange 15 of the head 14 has comparatively snug fit with the wall of the chamber 12 but the shaft and the element 19 thereon have a comparatively easy and running fit with the adjacent surfaces so that any leakage fluid which may have passed through the groove 20 will have to force its way out between the outer end of the element 19 and the inner end of the flange 15 and then between the head 14 and the shaft. To impede and check this flow I provide a sealing ring 24 which engages in the opposed grooves 25 and 26 in the element 19 and head flange 15 respectively, in which grooves the ring preferably has a running or floating fit so as to eliminate resistance. Any leakage liquid which has reached the outer end of the groove 20 will now have to find its way thru any available space there might be between the sealing ring 24 and the walls of the grooves 25 and 26, the sealing ring having sufficiently close fit in the groove to cut down the available closed space as much as possible while still permitting free or floating rotation of the ring.

By the time the fluid reaches the end of the groove 20, its pressure has been so reduced that practically no leakage liquid will get past the sealing ring 24 and there will be no leakage to the exterior. On account of the floating or running fit of the elements 19 and the sealing ring, any bearing friction is practically negligible and the leakage liquid will afford sufficient lubrication.

In connection with larger pump structures, where the pressure is higher, additional sealing provision could be made as for example as shown in Figure 4. Here the arrangement is substantially the same as in Figures 1 and 2, the felt retainer 23 being provided and interposed between the shaft and the spiral grooving in the element 19. To increase the flow retardation and the path of flow from the retainer to the grooving, the seat member 18 may be provided with an annular flange 27 engaging in the groove 28 in the inner end of the element 19, the element having a running fit with the flange. Any liquid, after having passed through the felt retainer, will have to flow around the extended surface between the flange 27 and the walls of the groove 28 before it can reach the spiral grooving in the element 19. At the outer end of the sealing assembly additional floating rings may be provided. I have shown two such rings 29 and 30 having running fit in opposed grooves in the elements 19 and the head flange 15.

Figure 5 shows an arrangement in which a number of sealing unit assemblies are provided. The inner sealing unit comprises the spirally grooved pump action element 31 which may be secured to the shaft as by press fitting, this element abutting the seat element 32 at the inner end of the chamber 33 formed in the housing extension 34 on the pump. The flange 35 on the seating element 32 extends a distance into the radial section of the L-shaped cross section channel 36 in the inner end of the element 31 and the felt retainer ring 37 extends around the outer end of the flange 35 to wipe back and obstruct the leakage liquid which must flow therethrough or therearound and between the adjacent ends of the elements 32 and 31 before reaching the spiral grooving 38 in the element 31 which has a running fit with the cylindrical wall of the chamber 33.

The second sealing unit comprises the element 39 which has the spiral grooving 40, and this element may be integral with the shaft 13. The closure head 41 at the outer end of the housing 34 has the flange 42 extending into the chamber 33 to abut the outer end of the element 39. Between the elements 31 and 39 is the spacer ring 43 which has a close or driving fit with the housing 34 so as to be non-rotatable.

One or more floating sealing rings 44 may be provided between the element 31 and the spacer ring 43, the rings engaging in grooves 45 and 46 in the element 31 and spacer ring respectively. One or more sealing rings 47 may be provided between the element 39 and the spacer ring and received in grooves 48 and 49 in the spacer ring and the element 39 respectively. One or more sealing rings 50 may also be provided for engagement in grooves 51 and 52 in the element 39 and the head flange 42 respectively.

Although I have shown but two sealing assembly units, it is obvious that any number of units may be provided depending upon the service desired.

With my improved sealing arrangement there are no friction bearing surfaces for the shaft or for the seal elements, and the shaft can be borne and kept in proper alignment solely by bearings provided in the pump structure and the driving motor structure. As no packing material is used in my sealing arrangement, there will be no scoring or wearing of the shaft, and as the sealing elements have running or floating engagement with the housing or with each other, the resistance will be reduced to a minimum and there will be no material loss of power between the driving motor and the pump. The sealing elements are all of annular form and can therefore be readily and economically made and assembled.

I have shown practical and efficient embodiments of the various features of my invention, but I do not desire to be limited to the exact construction, arrangement, and operation shown and described, as changes and modifications may be made without departing from the scope of the invention.

I claim as follows:

1. A seal structure for liquid pumps comprising a housing extension on the pump through which the driving shaft extends, a main seal element within said housing of larger diameter than said shaft and rotatable therewith and having running fit with the housing wall and having spiral grooving in its cylindrical surface forming a tortuous passage for the flow of leakage liquid, said main sealing element and said housing having opposed grooves surrounding and concentric with the shaft, and metallic sealing rings engaging in said grooves with free running fit therein.

2. A sealing structure for liquid pumps or the like, said sealing structure being within the pump housing extension through which the pump driving shaft extends, a main seal element within said housing rotatable with said shaft and having spiral grooving in its cylindrical surface cooperating with the housing wall to counteract the flow of leakage liquid from the pump, a felt retainer ring between one end of said sealing element and the adjacent end of the housing and surrounding said shaft, opposed grooves in the other end of said sealing element and the adjacent end of said housing and a sealing ring in said grooves having floating fit therein.

3. A sealing structure for liquid pumps or the like, said structure being within an extension housing from the pump structure through which the driving shaft extends, said structure comprising a sealing element rotatable with the shaft and having running fit with the housing wall and having spiral grooving in its cylindrical surface cooperating with the housing wall to counteract the flow of leakage liquid when the pump is operating, an annular channel in one end of said sealing element extending axially and then radially, and non-metallic compressible material within said channel surrounding said shaft, the other end of said sealing element and the adjacent end of said housing having aligned grooves, and a metallic sealing ring within said grooves concentric with the shaft and having floating fit in said grooves.

4. A sealing structure for liquid pumps or the like located within a sealing chamber formed by the pump housing and through which chamber the pump driving shaft passes, said sealing structure comprising a seating ring at the inner end of said chamber, a removable closure wall for the outer end of the chamber, a main sealing element within said chamber of larger diameter than the driving shaft and rotatable with the shaft and having running fit with the cylindrical wall of the chamber, said sealing element having grooving in its cylindrical surface cooperating with the chamber wall to counteract the escape of leakage liquid through the chamber, said sealing element abutting said seating ring at its inner end and having an annular channel, non-metallic compressible material within said channel for impeding the flow of leakage liquid to the surfaces between said sealing element and seating ring, the outer end of said sealing element and said closure wall having opposed grooves, and a sealing ring within said grooves having floating fit therein and serving as a final impediment to any liquid which may have escaped past the grooving of said main sealing element.

5. In a liquid pump or the like having a sealing chamber in its housing through which the driving shaft extends, sealing structure comprising a number of sealing units aligned within said chamber concentric with the driving shaft, each unit comprising a sealing element rotatable with the shaft and having running fit with the chamber wall and provided in its cylindrical surface with spiral grooving acting as a pump to counteract the flow of leakage liquid to the exterior of the sealing chamber, a spacer wall within the chamber between said sealing units, said spacer wall and the adjacent ends of said sealing elements having opposed channels, and sealing rings having running fit in said channels and serving to further impede the outflow of leakage liquid.

6. A sealing structure for liquid pumps or the like located within a sealing chamber formed by the pump housing and through which chamber the pump driving shaft passes, said sealing structure comprising a seating ring at the inner end of said chamber and surrounding said shaft, a removable closure wall for the outer end of said chamber, a main sealing element within said chamber of larger diameter than the driving shaft and rotatable with the shaft and having running fit with the cylindrical wall of the chamber, said sealing element having grooving in its cylindrical surface cooperating with the chamber wall to counteract the escape of liquid through the chamber, said seating ring having an inwardly extending flange surrounding said shaft, said sealing element being held in abutting engagement with said seating ring at its inner end and having an annular channel partially receiving the seating ring flange, and non-metallic compressible material within said channel and compressed therein by said seating ring flange.

ROY F. JEHL.